US012739137B2

(12) United States Patent
Pebay-Peyroula et al.

(10) Patent No.: US 12,739,137 B2
(45) Date of Patent: Sep. 15, 2026

(54) METHOD FOR PROVIDING A RANDOM FOR A CRYPTOGRAPHIC ALGORITHM, RELATED METHOD FOR PROCESSING A DATA AND COMPUTER PROGRAM

(71) Applicant: Commissariat à l'énergie atomique et aux énergies alternatives, Paris (FR)

(72) Inventors: Florian Pebay-Peyroula, Grenoble Cedex (FR); Carlo Cagli, Grenoble Cedex (FR); Mattieu Fauriat, Grenoble Cedex (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 205 days.

(21) Appl. No.: 18/519,145

(22) Filed: Nov. 27, 2023

(65) Prior Publication Data

US 2024/0179017 A1 May 30, 2024

(30) Foreign Application Priority Data

Nov. 28, 2022 (FR) ..................................... 22 12412

(51) Int. Cl.
*H04L 9/32* (2006.01)

(52) U.S. Cl.
CPC .................................. *H04L 9/3278* (2013.01)

(58) Field of Classification Search
CPC . H04L 9/3278; H04L 9/0866; H04L 2209/26; G09C 1/00; G06F 7/588
See application file for complete search history.

(56) References Cited

U.S. PATENT DOCUMENTS 12,368,606 B1 * 7/2025 Liu ....................... H04L 9/3242
2014/0126306 A1 5/2014 Otterstedt et al.
(Continued)

FOREIGN PATENT DOCUMENTS

KR 10-2150003 B1 8/2020

OTHER PUBLICATIONS

Preliminary French Search Report issued Jun. 9, 2023 in French Application 22 12412 filed on Nov. 28, 2022, 4 pages (with English Translation of Categories of Cited Documents).
(Continued)

*Primary Examiner* — Michael R Vaughan
*Assistant Examiner* — Abdullah Almamun
(74) *Attorney, Agent, or Firm* — Oblon, McClelland, Maier & Neustadt, L.L.P.

(57) ABSTRACT

The present A method of providing element a random element for a cryptographic algorithm implemented by an electronic calculator comprising a core and a set of memories, the set of memories including a reference memory having an intrinsic randomness in a predefined state of generating randoms. The method comprises reading a reference message in a first memory zone, the first memory zone being included in the reference memory, the reading step being performed in the state of generating random elements of the reference memory; writing the reference message in a second memory zone, distinct from the first memory zone, the second memory zone being included in the set of memories; and subsequent reading of the reference message in the second memory zone, the reference message read in the second memory zone forming the random element for the cryptographic algorithm.

18 Claims, 5 Drawing Sheets

(56) References Cited

U.S. PATENT DOCUMENTS

| | | | | |
|---|---|---|---|---|
| 2015/0101037 | A1* | 4/2015 | Yang | H04L 9/3278 726/16 |
| 2015/0207624 | A1* | 7/2015 | Laver | H04L 9/0894 713/189 |
| 2017/0046129 | A1* | 2/2017 | Cambou | H04L 63/06 |
| 2018/0337777 | A1* | 11/2018 | Shieh | G06F 21/73 |
| 2019/0221139 | A1* | 7/2019 | Schrijen | H04L 9/0866 |
| 2021/0109579 | A1* | 4/2021 | Bittlestone | G06F 21/73 |
| 2021/0399905 | A1* | 12/2021 | Kwak | H04L 9/3278 |
| 2023/0154525 | A1* | 5/2023 | Kim | G11C 7/24 365/185.04 |
| 2023/0418511 | A1* | 12/2023 | Yoo | G06F 3/062 |
| 2025/0260587 | A1* | 8/2025 | Adham | G06F 21/73 |

OTHER PUBLICATIONS

Sahay et al., "Recent trends in hardware security exploiting hybrid CMOS-resistive memory circuits", Semiconductor Science and Technology, vol. 32, No. 12, 2017, 17 pages.

Gao et al., "Emerging Physical Unclonable Functions With Nanotechnology", IEEE Access, vol. 4, 2016, 20 pages.

Office Action issued Jun. 3, 2026, in corresponding European Patent Application No. 23 212 190.5, citing document 2 herein, 4 pages.

Ibrahim Hebatallah M et al.: "Memristor-based PUF for lightweight cryptographic randomness", Scientific Reports, vol. 12, No. 1, May 23, 2022, 18 pages.

* cited by examiner

METHOD FOR PROVIDING A RANDOM FOR A CRYPTOGRAPHIC ALGORITHM, RELATED METHOD FOR PROCESSING A DATA AND COMPUTER PROGRAM

CROSS-REFERENCE TO RELATED APPLICATIONS

This application is a U.S. non-provisional application claiming the benefit of French Application No. 22 12412, filed on Nov. 28, 2022, which is incorporated herein by reference in its entirety.

FIELD

The present invention relates to a method for providing a random element for a cryptographic algorithm, the method being implemented by an electronic calculator.

The invention further relates to a method of processing data via a cryptographic algorithm using a random element, the method being implemented by an electronic calculator, and the random element being supplied by such a generating method.

The invention further relates to a non-transitory computer-readable medium including a computer program including software instructions which, when executed by a computer, implement such a generating method or such a processing method.

BACKGROUND

Physical Unclonable Functions (PUF) exploit an intrinsic random behavior of an electronic component in order to provide a random element for a cryptographic algorithm, such as an authentication or key generation primitive. The random behavior sought is said to be "static", because—for a given component—it has to be stable over time. For example, the key generated in the component has to be always the same, because if the key is used for encrypting the memory, over time the content would no longer be decryptable if the generated key varied.

The notion of reliability (or robustness) is important and is a problem that manufacturers of physical unclonable functions have to solve. For example, for physical unclonable functions based on static random-access memory, (SRAM-PUF) which exploit technological dispersions expressed by a bias at switching on, [the manufacturers] resorted to redundancy greater than a factor of 10 and to the use of error correcting algorithms, in order to overcome the reliability problem.

Document U.S. Pat. No. 10,572,190 B2 relates to an apparatus providing a PUF code, the apparatus comprising a pair of non-volatile memory cells and a data detection circuit. The detection circuit coupled to the pair of non-volatile memory cells, reads two initial states of the pair of non-volatile memory cells, and generates a PUF code by comparing the two initial states of the pair of non-volatile memory cells. If one of the memory cells of the pair is found to be at a lower resistance than the other of the memory cells of the pair, a write pulse will be performed on the first cell, in order to subsequently reduce the resistance thereof. As a result, the difference in resistance between the two cells will be widened. Such mechanism leads to making the supply of the PUF code more stable but requires the use of two memory cells for each random bit to be read.

Document U.S. Pat. No. 11,081,172 B1 describes a method for forming a security key on a chip. The method comprises the electrical connection in series of a pair of Phase Change Memory elements, also called PCM elements, the electrical connection of a programming transistor to the pair of PCM elements, the electrical connection of an input of an inverter to a common node of the pair of PCM elements, the setting of the PCM elements to a Low Resistance State (LRS) in an initialization step, the application of a reset pulse to generate a security bit and to switch one of the PCM elements to a High Resistance State (HRS), and the generation of a logic "1" or "0" at the output of the inverter. In the present document, a first PCM element of the pair is then initially in an LRS and is then reprogrammed in an HRS. Depending on the final resistance thereof, compared to the second PCM element of the pair, the inverter will output a random value. Such system then uses the resistance variation in the HRS, intrinsic to PCM technology, for obtaining the random value, and also requires the use of two PCM elements for such purpose.

Document US 2014/0140502 A1 relates to a device having a physical unclonable function (PUF), the device comprising an integrated circuit and a PCM, incorporated into the integrated circuit and including a plurality of cells, where the PCM is adjusted so as to lead to a phase variation on the plurality of cells, and where the phase variation comprises the physical unclonable function. Thereby, said document describes a way of programming the PCM cells so as to make the programmed resistance as random as possible. The above is done by choosing weak programming conditions, which do not make possible a full programming of the memory.

The document "*Design and security evaluation of PCM-based rPUF using cyclic refreshing strategy*" by Qi Zhang et al (2018) proposes a differential scheme for a reconfigurable PUF (rPUF) with a PCM, where the random element is extracted from variations in the programmed resistance from one write/erase cycle to another.

However, such methods of providing a random element for a cryptographic algorithm are not optimal.

SUMMARY

The goal of the invention is then to propose a method for providing, more efficiently, a random element for a cryptographic algorithm.

To this end, the subject matter of the invention is a method for providing a random element for a cryptographic algorithm, the method being implemented by an electronic calculator comprising a core and a set of memory/memories, the set of memory/memories including a reference memory having intrinsic randomness in a predefined state of generating random elements, the method comprising a initialization phase of initializing a physical unclonable function and a use phase of using the physical unclonable function;

the initialization phase comprising the following steps:

reading a reference message in a first memory zone, the first memory zone being included in the reference memory, the reading step being performed in the state of generating random elements of the reference memory;

writing the reference message in a second memory zone, distinct from the first memory zone, the second memory zone being included in the set of memory/memories;

and in that the use phase comprises the following step:

subsequent reading of the reference message in the second memory zone, the reference message read in the second memory zone forming the random element for the cryptographic algorithm.

With the generating method according to the invention, due to the intrinsic randomness of the reference memory in the predefined state of generating random elements, the reference message read in the first memory zone has a randomness, and the writing of the reference message in the second memory zone then makes possible the subsequent reading of the reference message in the second memory zone, without any risk of alteration of the reference message by a new reading of the first memory zone. Thereby, the reference message read forms the random element for the cryptographic algorithm.

Preferentially, when the reference memory is a non-volatile memory, for example a resistive memory, such as a phase change memory (PCM), the predefined state of generating random elements is an initial blank state of said memory. When the reference memory is a volatile memory, such as a static random-access memory (SRAM), the predefined state of generating random elements is a state at the switching on of said memory, i.e. the state at the powering of said memory.

According to other advantageous aspects of the invention, the generating method comprises one or a plurality of the following features, taken individually or according to all technically possible combinations:

the reference memory is chosen from a volatile memory and a non-volatile memory;

the volatile memory preferably being a static random access memory;

the non-volatile memory preferably being a resistive memory, further preferably chosen from the group consisting of: a phase-change memory, a hafnium oxide resistive random access memory, and a conductive bridging random access memory;

when the reference memory is the non-volatile memory, the predefined state of generating random elements is an initial blank state of said memory; and when the reference memory is the volatile memory, the predefined state of generating random elements is a state at the switching on of said memory;

when the reference memory is the non-volatile memory, the method further comprises a step of checking the state of the reference memory, in order to check whether the first memory zone is still in the state of generating random elements;

the checking step preferentially including a check of an absence of writing in the first memory zone via a reading of an associated configuration register; or/and a memory access control prohibiting a write access of the first memory zone;

the method further comprises a step of verification of the random element including a reading of a portion of the reference message in the first memory zone, a reading of the portion of the reference message in the second memory zone, then a comparison of the two portions of reference message read, the random element being considered correct if a difference between the two portions read is below a predefined threshold;

the reference message is preferentially a binary message, and the difference being the number of distinct bits between the two portions read during a bit-to-bit comparison of said portions;

the difference being preferentially still the Hamming weight of a comparison portion, the comparison portion being obtained via an EXCLUSIVE OR operation between the two portions read;

each portion preferentially still being the same batch of bits of the reference message, read in the corresponding memory zone;

the first memory zone includes word lines, bit lines, source lines and memory cells organized in a matrix including rows and columns, the memory cells of the same row being selectable by a word line, the memory cells of the same column being connected to at least one bit line and at least one source line, each memory cell including at least one memory component apt to store a value and at least one switch, each switch being controlled via a respective word line; and the first memory zone includes diodes blocking the writing in the memory cells, each bit line being connected to an electrical ground via a respective blocking diode, the blocking diode then being connected via the anode thereof to the corresponding bit line and via the cathode thereof to the electrical ground, each blocking diode being on when a voltage threshold is exceeded, the value of which is greater than a voltage for reading memory cells and less than a voltage for writing memory cells;

each source line being preferentially connected to the electrical ground via a respective blocking diode, the blocking diode then being connected by the anode thereof to the corresponding source line and via the cathode thereof to the electrical ground, the reference message being preferentially still a binary message, and each memory cell being apt to store a respective bit of the binary message; and the reference message being a binary message comprising N bits, N being an integer;

N being preferentially comprised between 256 and 8192.

The invention further relates to a method of processing a datum via a cryptographic algorithm using a random element, the method being implemented by an electronic calculator, and the random element being supplied by a generating method as defined above.

According to another advantageous aspect of the invention, the processing method comprises the following feature:

the cryptographic algorithm is chosen from the group consisting of: an encryption algorithm; and an authentication algorithm, such as a hash algorithm or a signature algorithm.

The invention further relates to a non-transitory computer-readable medium including a computer program including software instructions which, when executed by a computer, implement a generating method or processing method, as defined hereinabove.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

Hereinafter in the description, the expression "substantially equal to" and "on the order of" define a relation of equality within plus or minus 20%, preferentially still within plus or minus 10%, preferentially still within plus or minus 5%.

Figure 1:
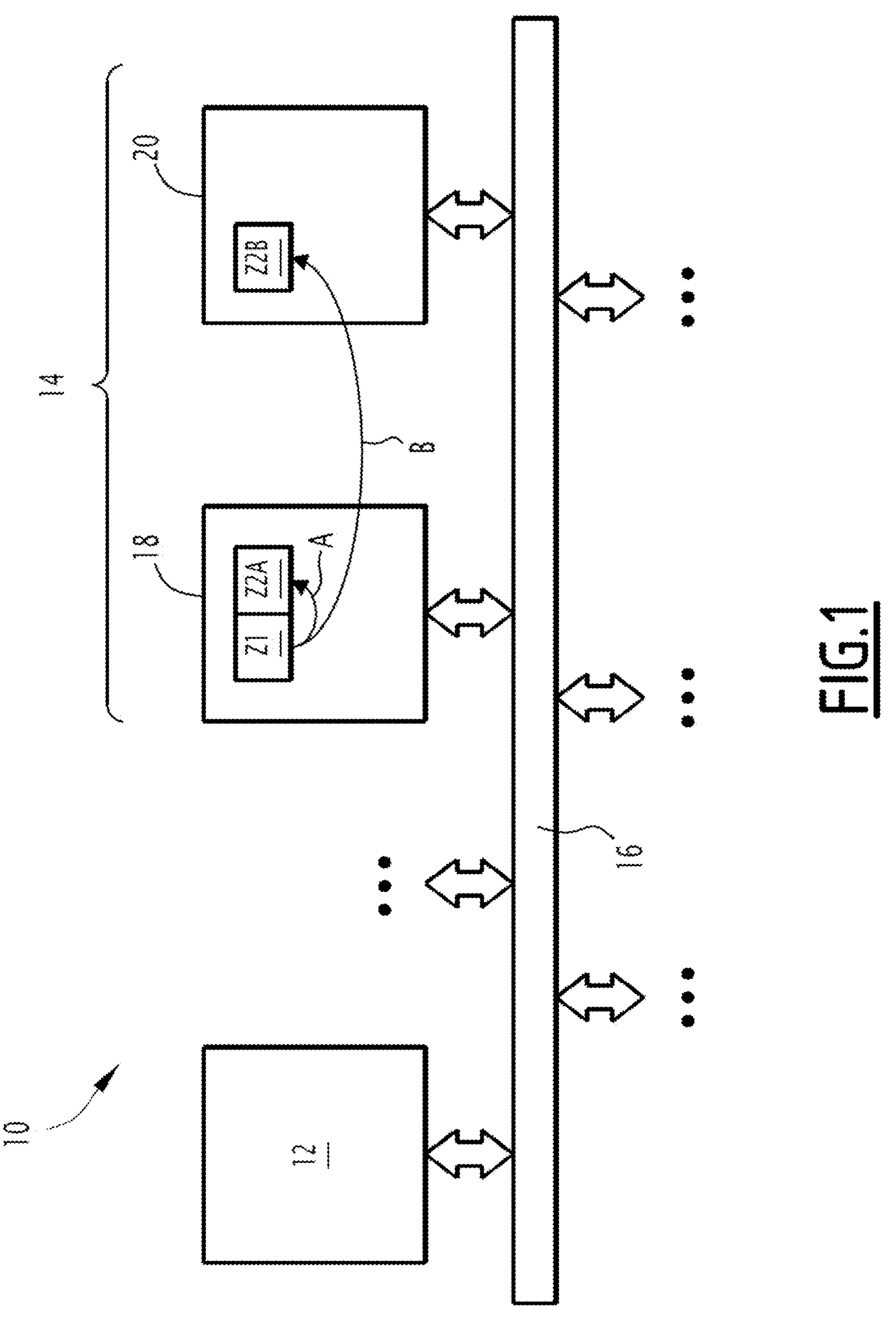
FIG. 1 is a schematic representation of an electronic calculator implementing the method according to the invention for providing a random for a cryptographic algorithm, the electronic calculator comprising a core and a set of memory/memories, the set of memory/memories including a reference memory.

In FIG. 1, an electronic calculator 10 comprises a core 12 and a set of memory/memories 14, and a communication bus 16 interconnecting the core 12 and said set 14. The electronic calculator 10 is configured for implementing the method according to the invention for providing a random for a cryptographic algorithm, described thereafter, in particular with reference to FIG. 2.

The electronic calculator 10 includes e.g. a multicore processor, and then comprises a plurality of cores 12.

The electronic calculator 10 is e.g. a system on chip (SOC).

The core 12 is an information processing unit core, known per se, and is typically a microcontroller core, or a processor core, such as a microprocessor core. As indicated above, the processor is e.g. a multicore processor, and the core 12 is then one of the cores of said processor.

The set 14 of memory/memories includes at least one memory, i.e. includes one or a plurality of memories. The set 14 includes in particular a reference memory 18 having an intrinsic randomness in a predefined state of generating randoms.

As an optional addition, the set 14 includes an additional memory 20.

The reference memory 18 is a non-volatile memory, for example a resistive memory, such as a phase change memory (PCM); or a volatile memory, such as a static random access memory (SRAM).

When the reference memory 18 is the non-volatile memory, for example the resistive memory, such as the phase change memory (PCM), the predefined state of generating randoms is an initial blank state of said memory. The other states of the phase change memory (PCM) are, as known per se, a written state (corresponding to the SET state), and an erased state (corresponding to the RESET state).

A PCM is a microelectronic component used for non-volatile storage of numerical data. A PCM exploits the amorphous-crystalline phase transition of a chalcogenide material (very often an alloy of germanium (Ge), tellurium (Te) and antimony (Sb)). The transition is achieved through electrical impulses that produce a localized heating of the material. The alloy reaches the melting temperature and is then cooled. If the cooling is "fast", the material will have an amorphous phase, corresponding to the erased state (also called OFF or RESET state). If, on the other hand, the cooling is "slow", the final state will be crystalline, corresponding to the written state (also called ON or SET state). The amorphous state is characterized by a high electrical resistance and is also called a high resistance state (HRS). The crystalline state is characterized by a low electrical resistance and is also called a low resistance state (LRS). Just after manufacturing, the PCM is in an intermediate state, the initial blank state (also called pre-forming), where the resistance thereof takes random values between the ON and OFF states, i.e. between the LRS and the HRS. Such random resistance of the PCM in the initial blank state thereof then corresponds to the intrinsic randomness of the reference memory 18.

The PCM is also sometimes referred to as PCRAM (Phase Change Random Access Memory). The PCM is a resistive random-access memory, also called RRAM (Resistive Random Access Memory).

A person skilled in the art will observe that even if a resistive random access memory (RRAM) of a type other than the PCM appears less suitable for implementing the generating method according to the invention, since types of resistive random access memory other than the PCM have a high initial resistance in the blank state, which then involves difficulties in reading the other types of resistive random access memory in the blank state thereof, the invention also applies to these other types of resistive memory. The other types of resistive random-access memory are e.g. OxRAM (hafnium-Oxide Random Access Memory); and CBRAM (Conductive Bridging Random Access Memory).

The papers "*A Strong Physically Unclonable Function With* $>2^{80}$ *CRPs and* <1.4% *BER Using Passive ReRAM Technology*" by M. R. Mahmoodi et al (2020) and "*Enhancing reliability of a strong physical unclonable function (PUF) solution based on virgin-state phase change memory (PCM)*" by L. Cattaneo et al (2023) describe examples of such resistive memories used to realize a physical unclonable function (PUF).

When the reference memory 18 is the volatile memory, such as the static random-access memory (SRAM), the predefined state of generating random elements is a state at the switching on of said memory, i.e. the state at the powering of said memory.

Figure 2:
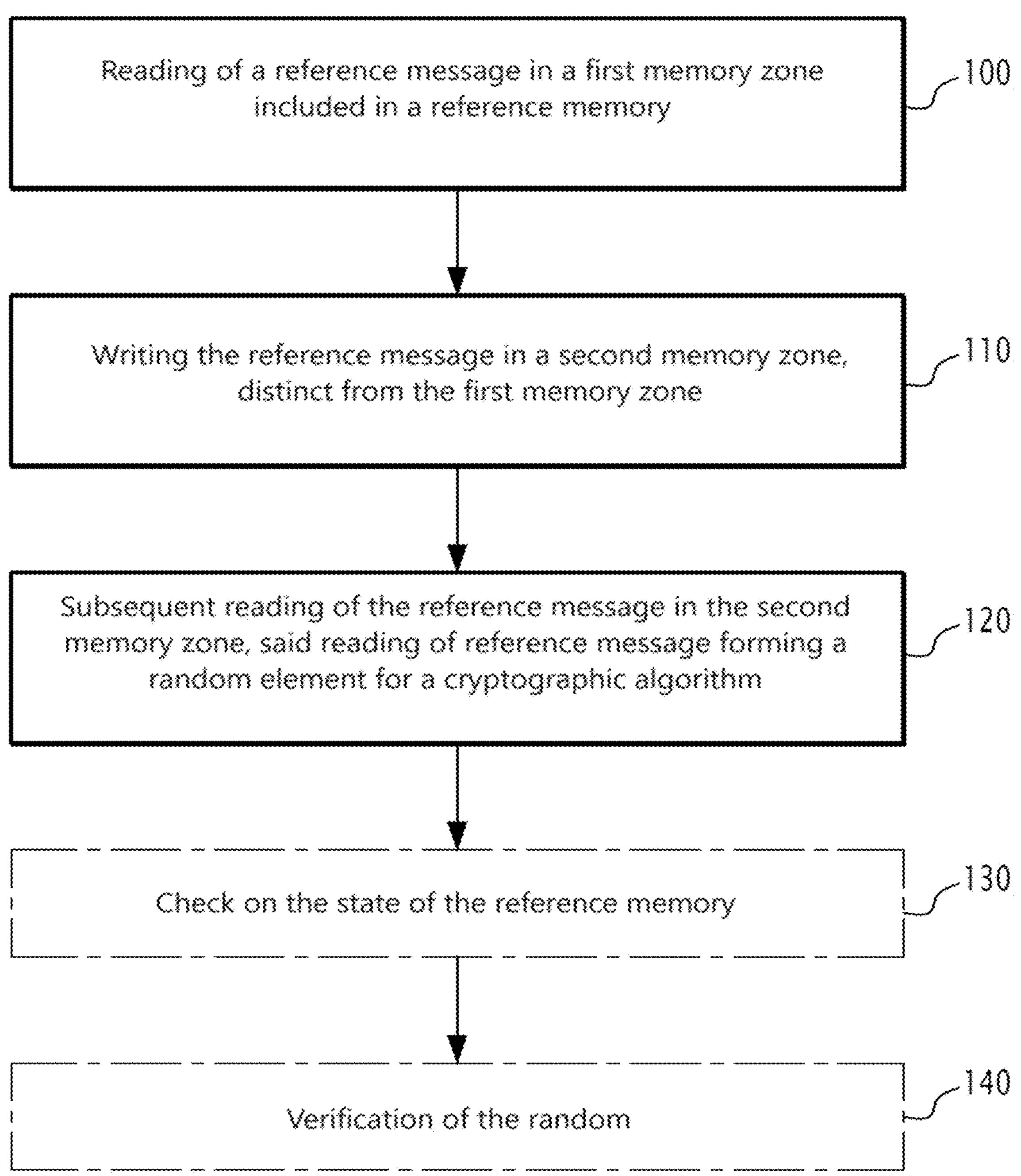
FIG. 2 is a flowchart of the method according to the invention for providing the random element for the cryptographic algorithm, the method including in particular the reading of a reference message in a first memory zone included in the reference memory, the writing of the reference message in a second memory zone distinct from the first memory zone, and the subsequent reading of the reference message in the second memory zone, the read reference message forming the random element for the cryptographic algorithm.

In FIG. 2, the method for providing the random element for the cryptographic algorithm firstly comprises a step 100 of reading a reference message in a first memory zone Z1, the first memory zone Z1 being included in the reference memory 18.

The method of providing the random element for the cryptographic algorithm is typically implemented by a computer program. The computer program includes software instructions which, when executed by a calculator, implement such a generating method. The instructions are e.g. software instructions, or else machine instructions, when the core 12 executing the computer program is a processor core. In a variant, the instructions are microcontroller instructions when the core 12 executing the computer program is a microcontroller core.

The reading step 100 is performed in the state of generating random elements of the reference memory 18.

When the reference memory 18 is the non-volatile memory, for example the resistive memory, such as the phase change memory (PCM), the reading step 100 is then performed in the initial blank state of the reference memory 18. In other words, during the reading step 100, the core 12 reads the reference message in the first memory zone Z1 of the reference memory 18 which is then in the initial blank state thereof.

When the reference memory 18 is the volatile memory, such as the static random-access memory (SRAM), the reading step 100 is then performed in the state at the switching on of the reference memory 18, i.e. in the state of powering the reference memory 18. In other words, during the reading step 100, the core 12 reads the reference message in the first memory zone Z1 of the reference memory 18 which is then in the switching on state thereof, i.e. in the powering state thereof.

The skilled person will note that, in the case of the volatile memory, this reading step 100 is also referred to as the obtaining step, and notably comprises a search for the most strongly biased bits in the first memory zone Z1, i.e. the bits in the first memory zone Z1 with the highest probability of always taking the same value in the switched-on state. This obtaining step 100 then involves identifying said most strongly biased bits, then storing the identifiers of these most strongly biased bits. This obtaining step 100 is therefore complex in the case of the volatile memory, involving several successive operations, i.e. sub-steps.

The generating method then comprises a step 110 of writing the reference message in a second memory zone Z2, distinct from the first memory zone Z1.

According to a first example, the second memory zone Z2 is also included in the reference memory 18 and is then denoted by Z2A. The writing 110, performed by the core 12, from the first memory zone Z1 to the second memory zone Z2A is then indicated by the arrow A in FIG. 1.

According to a second example, the second memory zone Z2 is included in the additional memory 20, distinct from the reference memory 18, and the second memory zone is then denoted by Z2B. The writing 110, performed by the core 12, from the first memory zone Z1 of the reference memory 18 to the second memory zone Z2B of the additional memory 20 is then indicated by the arrow B in FIG. 1.

According to the second example, the additional memory 20 is advantageously of a type distinct from the type of the reference memory 18.

As an example, if the reference memory 18 is the volatile memory, such as the SRAM, the additional memory 20 is advantageously a non-volatile memory, such as a flash memory, i.e. a rewritable semiconductor mass memory.

The reading 100 and writing 110 steps correspond to an initialization phase of the generating method, also called the enrollment phase. The initialization phase then initializes the physical unclonable function (PUF), and the reference message forms the random element, which is an intrinsic and static random element producing the physical unclonable function (PUF). The initialization phase is potentially executed several times during a life cycle of the computer 10, and is e.g. performed again if the user reinitializes the calculator 10 wherein the physical unclonable function (PUF) is included.

A person skilled in the art will observe that the step of writing 110 the reference message is then used for stabilizing the value of the reference message over time, and the reliability of the physical unclonable function (PUF) then corresponds to the reliability of the first reference memory 18 or else to the reliability of the additional memory 20, depending—according to the first or the second example—if the second memory zone Z2A, Z2B is included in the reference memory 18, or else in the additional memory 20.

The generating method according to the invention then comprises a use phase, during which, during the life cycle of the calculator 10, the user interrogates the physical unclonable function (PUF), e.g. in order to obtain a cryptographic key, or else to perform a challenge-response mechanism, depending on the type of cryptographic algorithm for which the random is provided.

During the use phase, the generating method then comprises a step 120 of subsequently reading the reference message in the second memory zone Z2A; Z2B, the reference message read in the second memory zone Z2A; Z2B forming the random for the cryptographic algorithm.

During the subsequent reading step 120, the core 12 simply reads the reference message contained in the second memory zone, which is, according to the first or the second example, included in the reference memory 18 and denoted by Z2A, or else included in the additional memory 20 and denoted by Z2B.

The reference message read in the second memory zone Z2A, Z2B forms the random element needed for the cryptographic algorithm, the random element serving e.g. as an authentication or key generation primitive.

A person skilled in the art will understand that the generating method according to the invention is used for providing, i.e. for producing, or else for generating, said random element; and the random element produced, or generated, is then obtained by reading the reference message in the second memory zone Z2A, Z2B.

The reference message is e.g. a binary message including N bits. The number N, representing the size of the reference message, is an integer typically comprised between 256 and 8192. The reference message is preferentially of a few kilobits, e.g. 1024 to 4096 bits, N then being comprised between 1024 and 4096, which is equivalent to the usual size of a cryptographic encryption key.

The size of the first memory zone Z1 typically corresponds to the size of the reference message. The size of the second memory zone Z2A, Z2B is then greater than or equal to the size of the first memory zone Z1, in order to have enough memory space in the second memory zone Z2A, Z2B for writing the reference message during the writing step 110. The second memory zone Z2A, Z2B is preferentially of identical size to the size of the first memory zone Z1.

As an optional addition, in particular when the reference memory 18 is the non-volatile memory, for example the resistive memory, such as the phase change memory (PCM), the generating method further comprises a step 130 of checking the state of the reference memory 18, for checking whether the first memory zone Z1 is still in the state of generating random elements, in other words in the blank state.

The checking step 130 includes e.g. a check of an absence of writing in the first memory zone Z1 via a reading of an associated configuration register; or/and a memory access control prohibiting a write access of the first memory zone Z1. Checking that there is no writing in the first memory zone Z1 then amounts to checking that the first memory zone Z1 has not undergone writing (forming) since the reading step 100. The memory access control then amounts to prohibiting, by memory access control, any writing (forming) in the first memory zone Z1.

Figure 5:
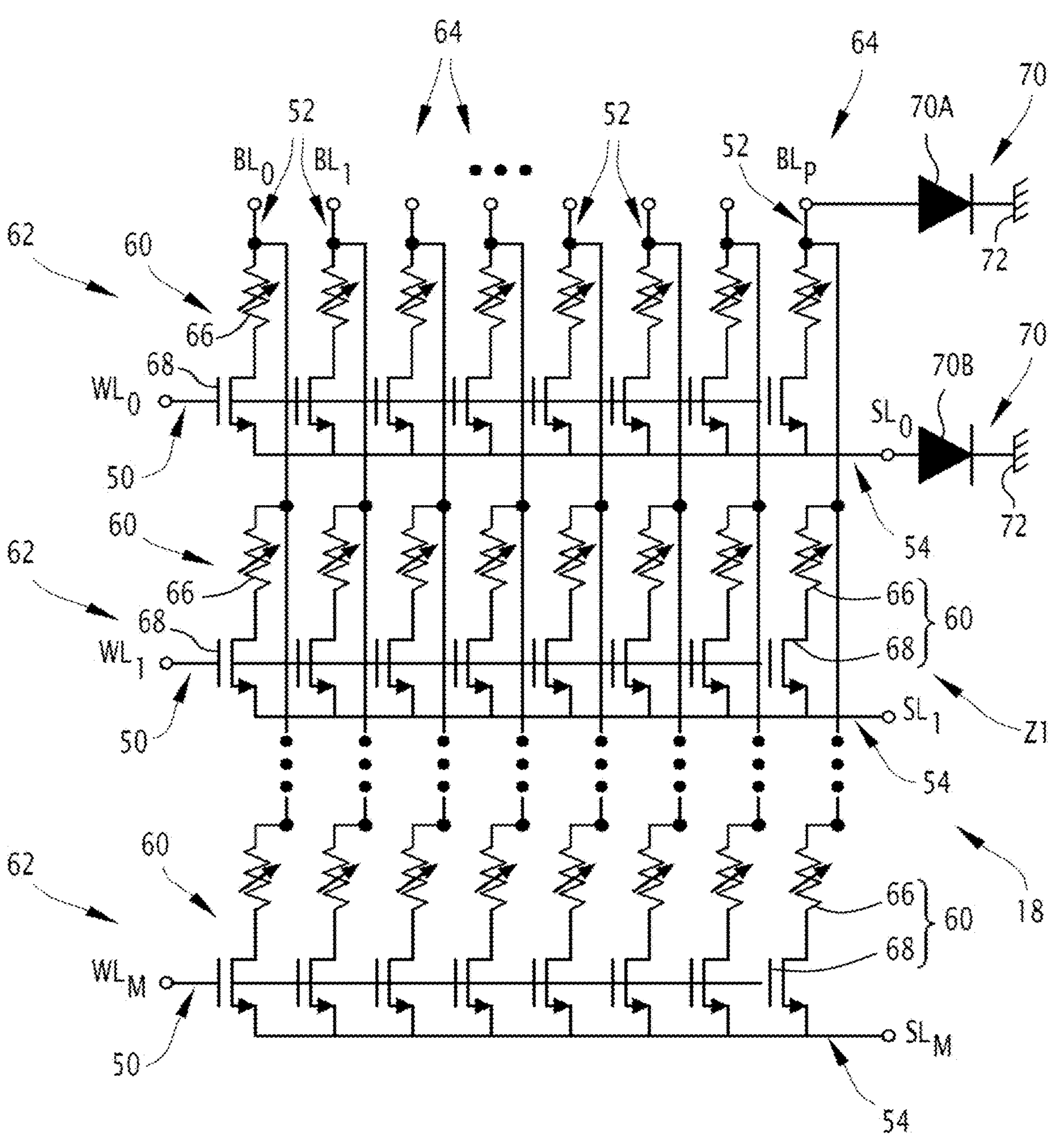
FIG. 5 shows the reference memory shown in FIG. 1, according to a supplementary aspect where the first memory zone comprises word lines, bit lines, source lines, memory cells each apt to provide one bit of the reference message, and, furthermore, diodes for blocking the writing in the memory cells.

The person skilled in the art will observe that the supplementary aspect described thereafter with reference to FIG. 5 also aims to prohibit writing in the first memory zone Z1.

As a further optional addition, more particularly if the user wishes to verify that the physical unclonable function (PUF) has not been cloned, the generating method further comprises a step 140 of verifying the random.

The verification step 140 includes a reading of a portion of the reference message in the first memory zone Z1 and a reading of the portion of the reference message in the second memory zone Z2A, Z2B; followed by a comparison of the two read reference message portions; the random element being considered to be correct if a difference between the two portions read is below a predefined threshold.

The reference message is typically a binary message, and the difference is then the number of distinct bits between the two portions read during a bit-by-bit comparison of said portions.

In such example where the reference message is a binary message, the difference is advantageously the Hamming weight of a comparison portion, the comparison portion being obtained via an EXCLUSIVE OR operation between the two portions read. Each portion is typically the same batch of bits of the reference message, read in the corresponding memory zone Z1, Z2A, Z2B.

A person skilled in the art will observe that the calculation of the Hamming weight amounts to counting the number of distinct bits between the two portions read during a bit-by-bit comparison of said portions.

A person skilled in the art will note that a reading error rate of the first memory zone Z1, more particularly when a blank zone of a PCM forming the reference memory 18 is concerned, is likely to increase with the aging of the reference memory 18 or under unfavorable pressure and temperature conditions, and that the predefined threshold, below which the random element is considered to be correct during the verification step 140, is then preferentially chosen taking into account the aging and/or the unfavorable pressure and temperature conditions.

The two feared events of a physical unclonable function (PUF) are the non-detection (the PUF is valid, but is verified as invalid), also called a false negative, and the false positive (the PUF is invalid, but verified as valid).

In order to dispense with the risk of non-detection or of false negative, e.g. the worst case is chosen by accepting a high error rate of 50%; i.e. by considering that one bit out of two differs between the two portions read during the bit-by-bit comparison of said portions.

The feared event of a false positive is the risk that there is a message, denoted by Mx, very altered wherein half the bits are exact by chance, and that the message Mx would validate condition 1, when said condition should not be validated. However, the probability of a false positive is extremely low. Indeed, considering that the message Mx has a size of N bits, and then N/2 bits are false, the probability PROB that the N/2 false bits are equal to N/2 bits of the reference message is expressed according to the number of combinations of N/2 elements among a set of N elements, divided by the number of possible reference messages. The probability PROB then satisfies the following equation:

$$PROB = \frac{(N - N/2)! \times (N/2)!}{N! \times 2N} = \frac{(N/2)! \times (N/2)!}{N! \times 2N} \quad [1]$$

Figure 4:
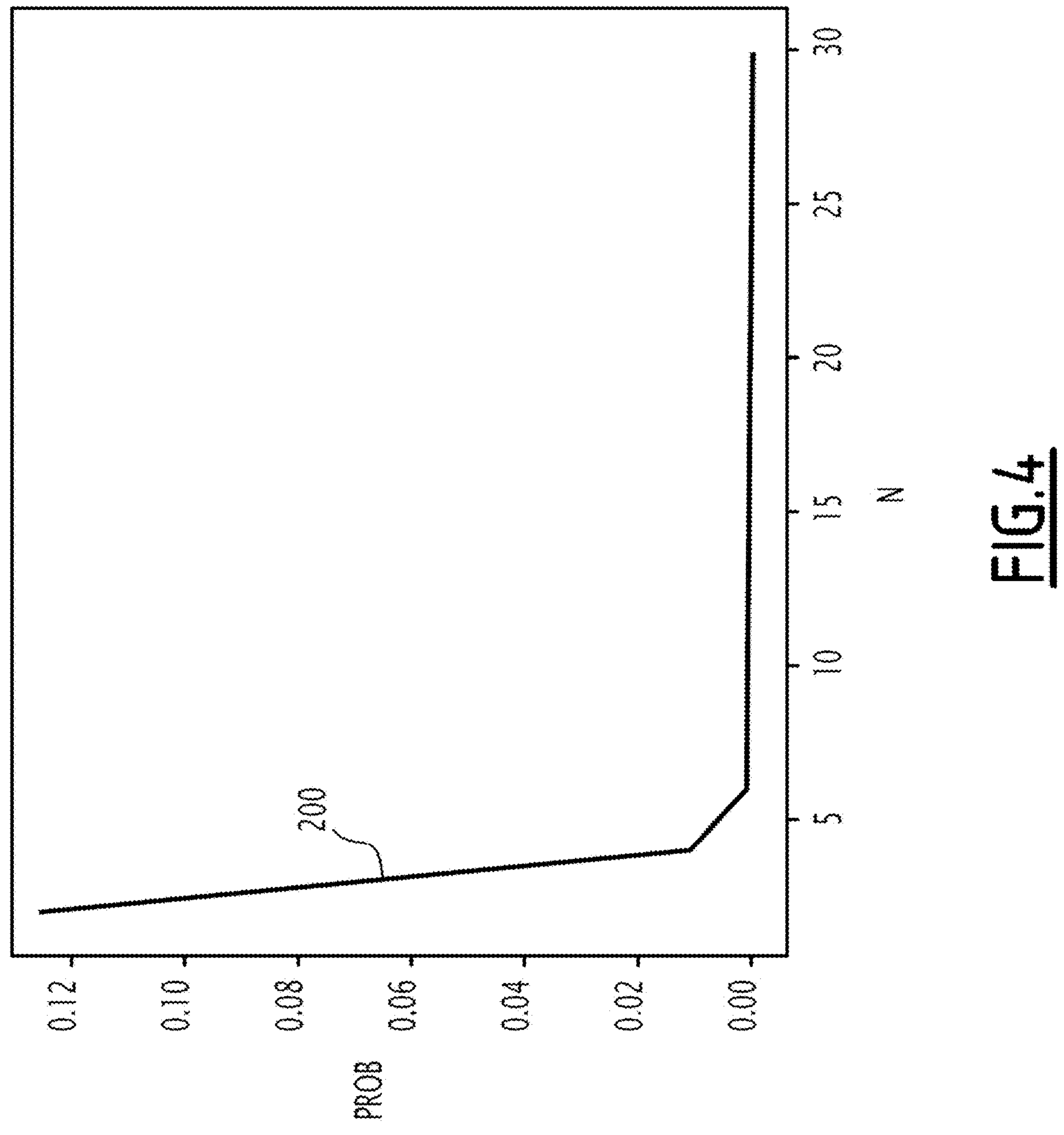
FIG. 4 is a curve illustrating a probability of a false positive as a function of a number of bits of the reference message, the false positive corresponding to the case where the read reference message forming the random element is invalid, but verified as valid during an optional step of verifying the random element.

The probability PROB is represented by the curve 200 in FIG. 4, which shows that the probability of a false positive decreases very rapidly when the size N of the reference message increases. For example, for a reference message 64 bits long, i.e. if N is equal to 64, then the probability PROB of a false positive is already extremely low, in the present case substantially equal to $2.95 \times 10^{-38}$.

Figure 3:
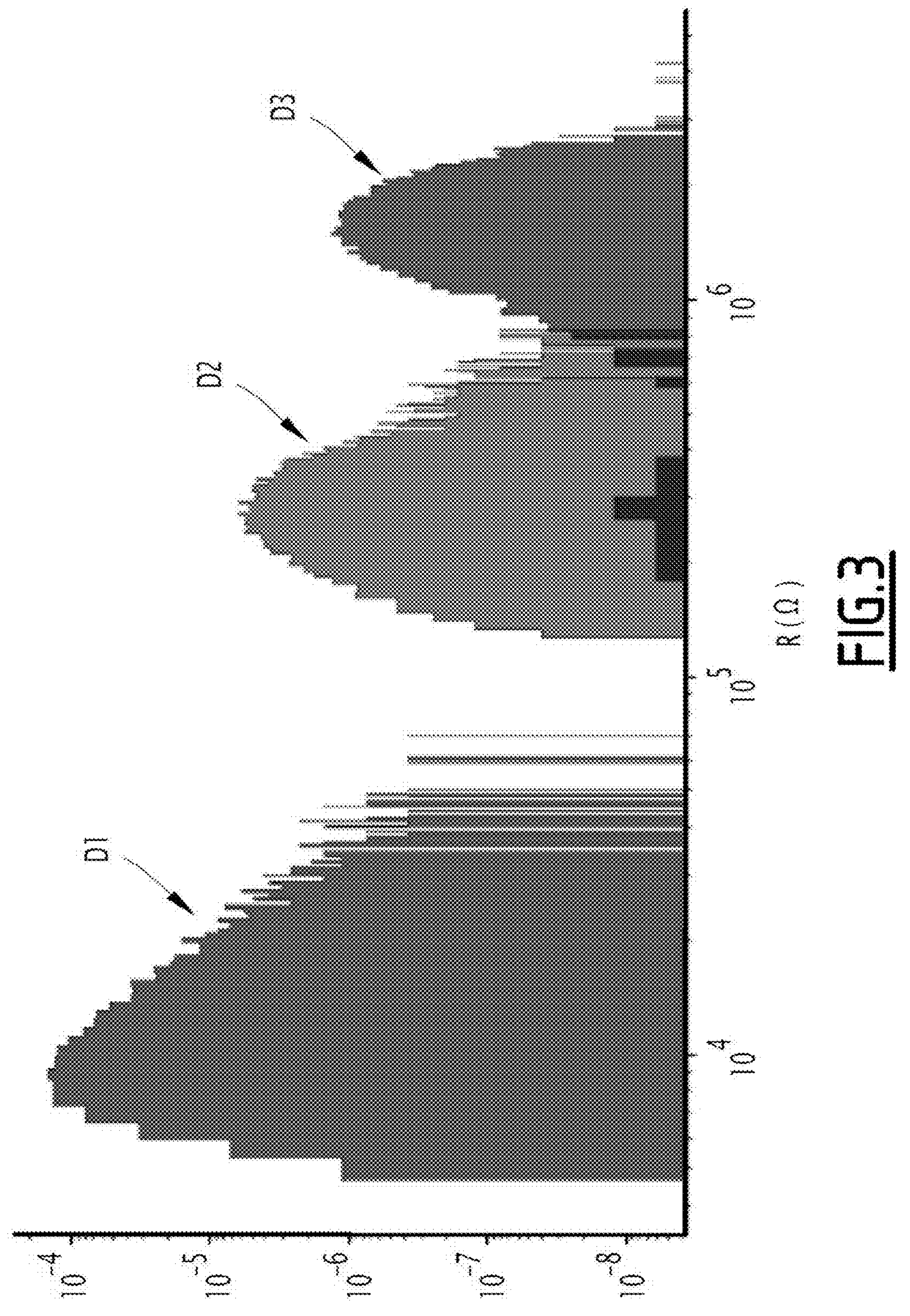
FIG. 3 is a view showing three resistance distributions for PCMs corresponding to each of the three possible states of the memories, namely a blank state (corresponding to the Pre-forming state), a written state (corresponding to the SET state), and an erased state (corresponding to the RESET state)

In FIG. 3, three resistance distributions for phase change memories (PCM) are represented corresponding to each of the three possible states of the memories, namely a first distribution D1 for the written state (corresponding to the SET state), a second distribution D2 for the blank state (corresponding to the pre-forming state), and a third distribution D3 for the erased state (corresponding to the RESET state).

A person skilled in the art will then observe that FIG. 3 shows that when the random element is obtained by reading the reference message in the first memory zone Z1 of the reference memory 18, produced in the form of a phase change memory (PCM), which is then in the initial blank state thereof, the random element is of very good quality, the distribution associated with the blank state, namely the second distribution D2, being a normal distribution, and also with an inter-PUF Hamming distance substantially equal to 0.4994 (i.e. sufficiently close to 0.5).

However, the inventors have also noticed that rereading the blank state of a phase change memory (PCM) is unreliable. Setting a resistance threshold in order to discriminate two binary states on the median of the second distribution D2 (corresponding to the distribution for the blank state) would involve a non-deterministic quantization. Indeed, measurements then show a bit error rate of 5 to 10% between each rereading of the same blank state. Also, producing a physical unclonable function (PUF) by simply reading the blank state of a phase change memory (PCM) would not be sufficiently reliable, without adding redundancy and/or error correction algorithms.

The generating method according to the invention then makes it possible to remedy such lack of reliability, in the absence of phase change memory (PCM) redundancy and/or error correction algorithm(s).

The invention further relates to a method for processing a datum via the cryptographic algorithm using the random, the method being implemented by an electronic calculator, the random being provided by the generating method according to the invention.

The electronic calculator implementing the processing method is e.g. the electronic calculator 10 implementing the generating method. In a variant, the electronic calculator implementing the processing method is an electronic calculator distinct from said electronic calculator 10.

The cryptographic algorithm is e.g. an encryption algorithm, or an authentication algorithm, such as a hash algorithm or a signature algorithm. The different types of cryptographic algorithms are known per se.

According to a supplementary aspect, in FIG. 5, the reference memory 18, and more particularly the first memory zone Z1, includes word lines 50, also referenced by WL (Word Line); bit lines 52, also referenced by BL (Bit Line); source lines 54, also referenced by SL (Source Line); and memory cells 60 organized in a matrix including rows 62 and columns 64.

In the example shown in FIG. 5, an integer index i associated with the rows 62 is comprised e.g. between 0 and M, and an integer index j associated with the columns 64 is comprised e.g. between 0 and P, so that the number of rows 62 is equal to M+1, and the number of columns 64 is equal to P+1.

The memory cells 60 of the same row 62 can be selected by a word line 50 and associated with the same source line 54. The word lines 50, and the source lines 54, respectively, are then also referenced by $WL_0$ to $WL_M$, and $SL_0$ to $SL_M$, respectively. The memory cells 60 of the same column 64 are associated with the same bit line 52. The bit lines 52 are then also referenced by $BL_0$ to $BL_P$. The memory cells 60 of the same column 64 are connected to at least one bit line 52 and to at least one source line 54.

Each memory cell 60 includes at least one memory component 66 apt to store a value and at least one switch 68, each switch 68 being connected to a respective memory component 66 and controlled via a respective word line 50.

According to a supplementary aspect, the first memory zone Z1 further comprises diodes 70A, 70B for blocking the writing in the memory cells 60.

Each bit line 52 is connected to an electrical ground 72 via a respective first blocking diode 70A. The first blocking diode 70A is then connected via the anode thereof to the corresponding bit line 52 and via the cathode thereof to the electrical ground 72.

As an optional addition, each source line 54 is connected to the electrical ground 72 via a respective second blocking diode 70B, the second blocking diode 70B then being connected via the anode thereof to the corresponding source line 54 and via the cathode thereof to the electrical ground 72.

Each blocking diode 70A, 70B is on when a voltage threshold is exceeded, the value of which is chosen to be higher than a reading voltage of the memory cells 60 and lower than a writing voltage of the memory cells 60. The blocking diodes 70A, 70B then authorize, i.e. make possible, only the reading of the associated memory cells 60, but not the writing of said cells.

When the reference message is a binary message, each memory cell 60 is apt to store a respective bit of the binary message.

Each memory component 66 is typically a memristor, i.e. a component the electrical resistance value of which changes permanently when a current is applied. Thereby, a datum can be recorded by a control current. Such behavior is observed in particular in phase change materials. The change in resistance of a memristor depends on the amplitude and on the duration of the voltage pulses applied through the memristor, as well as on the maximum value of current which can flow through the memristor e.g. for a "SET" operation, i.e. the change from a strong resistance to a weak resistance.

Thereby, each memristor has two states, namely a high state and a low state. The high state corresponds to a high resistance and is generally denoted by the aforementioned abbreviation HRS. The low state corresponds to a low resistance and is generally denoted by the aforementioned abbreviation LRS.

A high weight, i.e. a logical "1", is generally represented by the low state LRS of the memristor; and correspondingly, a low weight, i.e. a logical "0", is generally represented by the high state HRS of the memristor.

In a variant, the high weight is represented by the high state HRS of the memristor; and as a consequence, the low weight is represented by the low state LRS of the memristor.

A person skilled in the art will observe that the correspondence between the value of the weight and the resistive state of the memory component 66 is purely conventional. According to the convention chosen by the designer, the high weight can then correspond to the low state LRS, as well as to the high state HRS, and vice versa for the low weight, as it can be understood from the two preceding paragraphs.

Each switch 68 is typically e.g. a transistor, such as a field-effect transistor (FET). Thereby, each switch 68 has, as is known per se, three electrodes, namely a gate, a source and a drain. Each switch 68 is e.g. an isolated gate field effect transistor, also called MOSFET (Metal Oxide Semiconductor Field Effect Transistor).

Each switch gate 68 is connected to a respective word line WL. Depending on the voltage level present on the word line WL, the switch 68 is rendered ON or, on the contrary, OFF, i.e. blocked.

As is known per se, the word lines 50, the bit lines 52 and the source lines 54 are controlled by one or a plurality of controllers (not shown). A first controller is typically associated with the rows 62, and is then apt to control the word lines 50 and the source lines 54; i.e. to apply to the lines 50, 54, the appropriate voltages according to the operation to be performed on the memory cells 60 of the corresponding row 62. Similarly, a second controller is associated with the columns 64 and is then apt to control the bit lines 52; i.e. to apply to the bit lines 52, the appropriate voltages according to the operation to be performed on the memory cells 60 of the corresponding column 64.

A person skilled in the art will then understand that such supplementary aspect makes it possible to further improve the reliability of the random provided, i.e. of the physical unclonable function (PUF), against external attacks which would aim to modify the content of the physical unclonable function. Indeed, the blocking diodes 70A, 70B only allow the memory cells 60 to be read and prohibit any writing in said memory cells 60.

Thereby, it should be understood that the generating method according to the invention makes it possible to provide the random element more efficiently for the cryptographic algorithm, without the need for error correction or of memory redundancy algorithm(s) having the state of generating randoms.

The invention claimed is:

1. A method for providing a random element for a cryptographic algorithm, the method being implemented by an electronic calculator comprising a core and a set of memories, the set of memories including a reference memory having intrinsic randomness in a predefined state of generating random elements, the method comprising:

an initialization phase of initializing a physical unclonable function; and a use phase of using the physical unclonable function, wherein the initialization phase comprises:

reading a reference message in a first memory zone, the first memory zone being included in the reference memory of the set of memories, the reading step being performed in a predefined state of generating random elements of the reference memory, wherein the reference memory is a volatile memory or a non-volatile memory, wherein when the reference memory is the non-volatile memory, the predefined state of generating random elements is an initial blank state of said memory, and when the reference memory is the volatile memory, the predefined state of generating random elements is a state at a switching on of the reference memory; and writing the reference message in a second memory zone, distinct from the first memory zone, the second memory zone being included in the set of memories; and the use phase comprises subsequent reading of the reference message in the second memory zone, the reference message read in the second memory zone forming the random element for the cryptographic algorithm.

2. The method according to claim 1, wherein the volatile memory is a static random access memory.

3. The method according to claim 1, wherein the non-volatile memory is a resistive memory.

4. The method according to claim 1, wherein the non-volatile memory is a phase-change memory, a hafnium oxide resistive random access memory, or a conductive bridging random access memory.

5. The method according to claim 1, wherein when the reference memory is the non-volatile memory, the method further comprises checking a state of the reference memory, in order to check whether the first memory zone is still in the state of generating random elements.

6. The method according to claim 5, wherein the checking step includes checking an absence of writing in the first memory zone via a reading of an associated configuration register; or/and and/or a memory access control prohibiting a write access of the first memory zone.

7. The method according to claim 1, wherein the method further comprises verifying the random element including reading a portion of the reference message in the first memory zone, reading the portion of the reference message in the second memory zone, and comparing the two read portions of reference messages, the random element being considered correct if a difference between the two read portions is below a predefined threshold.

8. The method according to claim 7, wherein each reference message is a binary message, and the difference being a number of distinct bits between the two read portions during a bit-to-bit comparison of said portions.

9. The method according to claim 8, wherein the difference is a Hamming weight of a comparison portion, the comparison portion being obtained via an EXCLUSIVE OR operation between the two read portions.

10. The method according to claim 8, wherein each portion is a same batch of bits of the corresponding reference message, read in the corresponding memory zone.

11. The method according to claim 1, wherein the first memory zone includes word lines, bit lines, source lines, and memory cells arranged in a matrix having rows and columns, the memory cells of a same row being selectable by a word line, the memory cells of a same column being connected to at least one bit line and to at least one source line, each memory cell including at least one memory component configured to store a value and at least one switch, each switch being controlled via a respective word line; and the first memory zone includes diodes to block the writing in the memory cells, each bit line being connected to an electrical ground via a respective blocking diode, the blocking diode being connected via an anode thereof to the corresponding bit line and via a cathode thereof to the electrical ground, each blocking diode being on when a voltage threshold is exceeded, the value of which is higher than a reading voltage of the memory cells and lower than a writing voltage of the memory cells.

12. The method according to claim 11, wherein each source line is connected to the electrical ground via a respective blocking diode, the blocking diode being connected via anode thereof to the corresponding source line and via the cathode thereof to the electrical ground.

13. The method according to claim 11, wherein the reference message is a binary message, and each memory cell is configured to store a respective bit of the binary message.

14. The method according to claim 1, wherein the reference message is a binary message having N bits, N being an integer.

15. The method according to claim 14, wherein N is between 256 and 8192.

16. A method of processing a datum via a cryptographic algorithm using a random element, the method being implemented by the electronic calculator, wherein the random element is provided by the method according to claim 1.

17. The method according to claim 16, wherein the cryptographic algorithm is an encryption algorithm or an authentication algorithm.

18. A non-transitory computer-readable medium including a computer program including software instructions which, when executed by the calculator, implement the method according to claim 1.

* * * * *